United States Patent Office 3,606,393
Patented Sept. 20, 1971

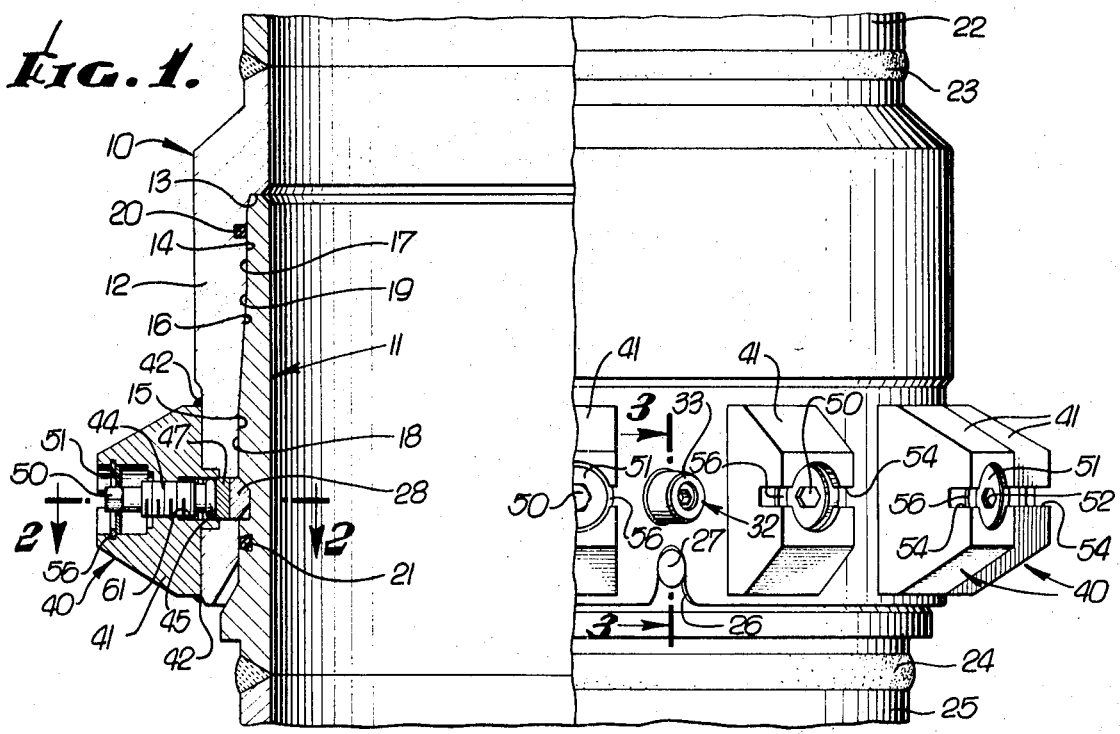

3,606,393
PIPE CONNECTORS
Carl F. Huntsinger, Ojai, and Fritz R. Huntsinger, Jr., Joseph H. Hynes, and George B. Bulgin, Ventura, Calif., assignors to Vetco Offshore Industries, Inc., Ventura, Calif.
Filed Sept. 5, 1969, Ser. No. 855,535
Int. Cl. F16l 15/00
U.S. Cl. 285—90　　11 Claims

ABSTRACT OF THE DISCLOSURE

A marine riser connector for underwater well head equipment, the riser connector having a pin member provided with a groove for receiving a resilient lock ring carried by a box member. The lock ring has overlapped ends and is centralized in a groove in the box by spring-loaded centralizer pins. The lock ring is actuatable into locking engagement within the groove in the pin by actuator screws having lock ring engaging pads; and lock plates are provided to prevent rotation of the actuator screws except when they are engaged by a driving tool.

In the drilling of wells, such as oil or gas wells beneath a body of water, it is sometimes the practice to land the well head equipment at the bottom of the body of water. In such instances, so-called marine risers are employed, the riser being constituted by a tubular conduit extending upwardly through the body of water to the drilling vessel or platform. Moreover, it is the practice to releasably connect such risers to the well head equipment, and more particularly, to an upstanding tubular pin member which is adapted to telescopically receive a box member carried at the lower end of the riser conduit. Releasable latch means are provided for releasably connecting the box member to the pin member of such marine riser connections, and these means include a resilient lock ring carried by the box member in an annular groove therein and adapted to be actuated or forced inwardly into locked engagement in a groove provided about the outer periphery of the pin member.

The construction and use of such marine connectors poses problems in respect of the initial centralization of the lock ring, as well as in respect of the actuation of the lock ring into locking coengagement with the pin member. Undesired release of the lock ring has also posed problems.

Heretofore, the lock ring has been split by the provision of a gap which allows circumferential deformation of the lock ring when it is actuated into locking engagement in the groove in the pin member. Such a gap has required the utilization of locating or orientation means, so that the lock ring was held in a fixed angular relation to the actuators for deforming the lock ring into locking engagement in the groove in the pin member. In some instances, because of the fixed orientation, if the actuating means are not operated in a particular sequence, the locking or orientation means could be destroyed due to the circumferential deformation of the lock ring.

Such actuating means for deforming the lock ring have typically comprised actuator screws, the inner ends of which are in contact with the outer periphery of the lock ring. In some circumstances, therefore, vibration has been known to cause the actuator screws to back out.

The usual lock ring heretofore employed has been centralized within the lock ring carrying groove of the box member by a resilient liner in the groove in back of the lock ring, such liners being made of foam rubber-like material which, under some circumstances, may ball up, preventing ease of expansion of the lock ring back into the groove in the box member, rendering separation of the joint difficult.

The present invention provides a novel pipe connector which avoids the above-noted problems.

More particularly, the lock ring of the present marine riser connector is split in such a manner as to avoid the existence of a gap. Specifically, the lock ring is split by a diagonal cut, whereby the lock ring has overlapping ends. Such lock ring construction eliminates the need for locating or orientation means to hold the lock ring in any particular angular relation to the actuator screws. The actuator screws, therefore, need not be made up or operated to effect locking engagement of the lock ring in the groove of the pin member in any particular sequence, but, instead, the actuator screws may be operated in any convenient sequence.

Furthermore, the actuator screws include pads engaged with the lock ring between the rotatable screw and the lock ring, and means are provided for locking the actuator screws against inadvertent rotation, thereby avoiding any tendency of the actuator screws to back out due to vibration.

In addition, the invention provides a number of centralizing pins located in circumferentially spaced relation about the box member and engaged with the lock ring to centralize the same within the supporting groove in the box member, the centralizing pins being spring loaded inwardly to centralize the lock ring. This structure facilitates operation of the connector.

An object of the invention is to provide a marine riser connector which is of rugged construction, which is easy to use, and trouble free in its operation.

This invention possesses many other advantages, and has other purposes which may be made more clearly apparent from a consideration of a form in which it may be embodied. This form is shown in the drawings accompanying and forming part of the present specification. It will now be described in detail, for the purpose of illustrating the general principles of the invention; but it is to be understood that such detailed description is not to be taken in a limiting sense.

Referring to the drawings:

FIG. 1 is a view partly in side elevation and partly in longitudinal section, showing a marine riser connector embodying the invention;

FIG. 2 is a fragmentary horizontal section, on an enlarged scale, as taken on the line 2—2 of FIG. 1;

FIG. 3 is a fragmentary vertical section, on an enlarged scale, as taken on the line 3—3 of FIG. 1; and FIG. 4 is a detailed isometric view of the lock ring of the present invention.

As seen in the drawings, the marine riser connector comprises an external or box member 10 adapted to telescopically fit upon a pin member 11. The box member 10 comprises an elongate skirt portion 12 having an internally downwardly facing shoulder 13, an upper cylindrical inner wall 14, a lower cylindrical inner wall 15 and an intermediate conical or tapered inward wall 16. The pin member 11 is adapted to abut at its upper end with the shoulder 13. It has an upper cylindrical outer wall 17, a lower cylindrical outer wall 18 which fit within the cylindrical walls 14 and 15 of the box member respectively, and also a tapered and intermediate external wall 19 adapted to fit within the tapered wall 16 of the box member 10. Suitable seals are provided, comprising an O-ring type seal 20 interposed between the cylindrical walls 14 and 17 of the box member 10 and the pin member 11, and another O-ring type seal 21 interposed between the cylindrical walls 15 and 18 of these members.

At its upper end, the box member 10 is adapted to be connected to a riser conduit section 22, as by a weld 23, the riser conduit 22 being adapted to extend upwardly through a body of water to a well drilling platform or vessel (not shown). At its lower end, the pin member 11 is adapted to be connected by a weld 24 to a stationary portion 25 of well head equipment which may be secured at the bottom of a body of water, as is well known.

Locating means may be provided for determining the relative orientation of the box member 10 and the pin member 11. Accordingly, the skirt portion 12 of the box member has a downwardly opening slot or notch 26 receiving an outwardly extended locater pin 27 secured to the pin member when the box and pin members 10 and 11 are in a predetermined relative angular relation.

In order to lock the box and pin members 10 and 11 together against axial separation, a split, resilient lock ring 28 is carried in an internal annular box groove 29 which extends circumferentially within the cylindrical wall 15 of the skirt portion 12. This lock ring 28 is adapted to also engage an external pin groove 30 extending circumferentially around the cylindrical wall 18 of the pin member 11. The lock ring 28, in accordance with one of the features of the invention, has a split 31 on a line extending diagonally or non-radially through the lock ring to provide overlapping ends 31a and 31b, best seen in FIG. 4, whereby the ring, for practical purposes, is circumferentially continuous.

Moreover, the lock ring 28 is adapted to expand outwardly fully into the groove 29 in the box member 10 or to be caused to contract into the groove 30 in the pin member 11. When the box member 10 is moved axially or telescopically onto the pin member 11, the lock ring 28 is expanded upon engagement with the upper end of the pin member 11. Thus, the lock ring 28 has beveled surfaces 28a and 28b adapted to effect a camming action to effect such expansion of the lock ring when engaged by the pin member 11. The tapered faces 28a and 28b on the ring 28 are similar and therefore, the lock ring 28 has no top or bottom since it is symmetrical about a central plane normal to its axis. For purposes of assembly, it is insensitive to the manner in which it is disposed in the groove 29 of the box member 10. Either face 28a or 28b is adapted to engage the beveled top face 30a of the groove 30 in the pin member 11, when the lock ring 28 is circumferentially contracted into locking engagement in the groove 30 of the pin member 11, as seen in FIG. 3.

Since the diameter of the base of the groove 29 in the box member 10 is greater than the relaxed or contracted diameter of the lock ring 28, to allow for outward expansion of the lock ring as it moves downwardly over the pin member 11 and onto the cylindrical wall 18 of the latter, the lock member 28 is held yieldably centered in the groove 29 by centralizer means, generally denoted at 32, provided at angularly spaced locations about the box member 10. A representative centralizer means 32 is shown in FIG. 3. The centralizer means includes a tubular body 33 having a bore 34 in which is reciprocably disposed the enlarged head 35 of a pin 36, the pin extending through an opening 37 in the box member 10 with the inner end of the pin 36 engaging the outer periphery of the lock ring 28. A coil compression spring 38 is disposed in the bore 34 of the body 33 in engagement with the head 35 and a plug 39 threaded into the body 33 to provide a spring seat. With such a centralizer construction located at circumferentially spaced positions about the box member 10, the ring 28 will be normally centralized, but capable of expansion and contraction to enable the connector to be assembled and disassembled.

To actuate the lock ring 28 and effect its contraction into locking position in the groove 30 of the pin member 11, a plurality of actuator devices, generally denoted at 40, are circumferentially spaced about the box member 10. A typical actuator device 40 comprises a boss or body 41 welded, as at 42, to the box member 10. The body 41 includes a threaded bore 43 in which is disposed a threaded actuator screw 44 having an annular enlargement or flange 45 at its inner end rotatably disposed in a slot 46 in an actuator pad 47. This actuator pad is disposed in a radial opening 48 in the box member 10 and has an inner face 49 curved to conform generally to the outer periphery of the lock ring 28. At its outer end, the actuator screw 40 has a noncircular or hexagonal head 50 adapted to be engaged by a driving tool or wrench (not shown), so that the pad 47 may be shifted inwardly to deform or contract the lock ring 28 into locking engagement in the groove 30 of the pin member 11, or the pad 47 may be shifted outwardly to allow expansion of the lock ring 28 during connection of the box member 10 to or removal or disconnection of the box member 10 from the pin member 11.

Since under some circumstances, vibration may tend to cause the actuator screw 44 to back-off, thereby enabling undesired expansion of the lock ring 28 and disconnection of the connector, each actuator device 40 includes a lock plate 51 reciprocable with respect to the actuator screw 44 and having a non-circular or hexagonal opening 52 conforming to and adapted to receive the head 50 of the actuator screw when the lock plate 51 is in its normal position. The actuator body 41 has an outer bore 53 and a pair of opposed radial slots 54 receiving ears 55 of the lock plate 51 to permit axial but non-rotative movement of the plate in the actuator body 41. A split retainer ring 56 is disposed in the bore 53 to limit outward movement of the lock plate 51, as best seen in FIG. 2, to a location at which the actuator screw head 50 is disposed in the complemental opening 52 of the lock plate 51. A pair of compression springs 57 disposed in bores 58 in the body 41 are centered by pins 59 carried by the ears 55 of the lock plate 51 and engage such ears to normally bias the lock plate 51 to the position of FIG. 2, at which rotation of the actuator screw 44 is prevented. However, the application of a wrench to the screw head 50 will cause the wrench to effect inward displacement of the lock plate 51 to a location at which the plate 51 is disposed about a reduced diameter circular portion 60 of the actuator screw 44, so that the actuator screw is permitted to be rotated by the wrench in either direction. When the wrench is removed from the screw head 50, the lock plate 51 will be automatically biased by the springs 57 to a screw locking position. If the non-circular opening 52 and the non-circular head 50 are not so relatively oriented as to permit locking engagement, the screw may be slightly turned until the head 50 and opening 52 are in registry. Alternatively, the lock plate need not initially re-engage the screw head 50, but automatic re-engagement will occur if vibration effects rotation of the screw 44 to the slight extent necessary to effect registry of the opening 52 with the head 50.

In the use of the connector, when the box member 10 is to be applied to the pin member 11, the actuator screw 44 is rotated and backed out so that the pad 47 is retracted into a slot 61 in the actuator body 41, at which location the lock ring 28 is free for maximum required expansion as the box member 10 moves axially over the exterior of the pin member 11. When the box member 10 is fully seated upon the pin member 11, with the grooves 29 and 30 in opposed relation, the actuator screws 44 may be moved inwardly in any desired sequence to deform the lock ring 28 inwardly into full locking engagement in the groove 30. Conversely, if the connector is to be disconnected, it is only necessary to back-off the actuator screws 44 until the lock ring 28 is free to expand circumferentially into the groove 29 in the box member 10. At this time, an axial pull on the box member 10 will cause the lock ring 28 to be cammed outwardly by the coengagement between the beveled wall 30a of the groove 30 and the tapered surface 28a or 28b of the lock ring 28.

We claim:

1. In a connector: a tubular pin member having an outer peripheral groove extending circumferentially therearound, a tubular box member telescopically coengageable with said pin member and having an inner peripheral groove extending circumferentially therein, a split lock ring disposed in said groove in said box member, said lock ring having a cam portion engageable by said pin member to expand said ring laterally outwardly in said inner peripheral groove to permit relative telescoping of said box member over said pin member, actuator means on said box member for deforming said ring circumferentially to force said ring into locking engagement in said groove in said pin member, said box member having a plurality of yieldable centralizer means spaced circumferentially of said box member for centralizing said ring in said groove in said box member by tending to hold said ring uniformly spaced from the base of the box member groove prior to deforming of said ring into locking engagement in said pin member groove.

2. In a connector as defined in claim 1, each of said centralizer means including a pin extending radially of said box member, one end of said pin being engaged with said ring, and a spring acting on the other end of said pin to force said pin against said ring.

3. In a connector as defined in claim 2, each of said centralizer means including a hollow body extending radially from said box member, an opening in said box member communicating with said body and in which said pin is reciprocable, said spring being disposed in said body.

4. In a connector as defined in claim 2, each of said centralizer means including a hollow body extending radially from said box member, an opening in said box member communicating with said body and in which said pin is reciprocable, said spring being disposed in said body, said body having a bore larger than said opening, and said pin having an enlarged head at said other end reciprocable in said bore.

5. In a connector as defined in claim 2, each of said centralizer means including a hollow body extending radially from said box member, an opening in said box member communicating with said body and in which said pin is reciprocable, said spring being disposed in said body, said body having a bore larger than said opening, said pin having an enlarged head at said other end reciprocable in said bore, and a plug threadedly engaged in said bore, said spring engaging said plug and enlarged head.

6. In a connector: a tubular pin member having an outer peripheral groove extending circumferentially therearound, a tubular box member telescopically coengageable with said pin member and having an inner peripheral groove extending circumferentially therein, a split lock ring disposed in said groove in said box member, and actuator means on said box member for deforming said ring circumferentially to force said ring into locking engagement in said groove in said pin member, said actuator means comprising a plurality of actuator devices spaced circumferentially about said box member and engageable with said ring in said groove in said box member, each of said actuator devices including a body carried by said box member, a threaded bore in said body extending radially relative to said groove in said box member, a screw threaded in said bore, an opening in said box member aligned with said bore and box member groove, and a pad in said opening interposed between an end of said screw and said ring, said pad engaging but being free from connection with said ring.

7. In a connector as defined in claim 6, said pad having a ring engaging surface curved to conform to the outer periphery of said ring.

8. In a connector as defined in claim 6, the screw locking means carried by said body and releasably engaged with said screw to prevent rotation of said screw.

9. In a connector as defined in claim 6, and screw locking means carried by said body and releasably engaged with said screw to prevent rotation of said screw, said screw locking means including a non-circular portion on said screw, a plate reciprocably supported by said body and having a non-circular opening conforming to said non-circular end of said screw, said plate having ears slidable in slots in said body to prevent rotation of said plate, and spring means for biasing said plate to a position at which said non-circular end of said screw is engaged in said non-circular opening.

10. In a connector: a tubular pin member having an outer peripheral groove extending circumferentially therearound, a tubular box member telescopically coengageable with said pin member and having an inner peripheral groove extending circumferentially therein, a split lock ring disposed in said groove in said box member, and a plurality of actuator devices spaced circumferentially about said box member and engageable with said ring in said groove in said box member for deforming said ring circumferentially to force said ring into locking engagement in said groove in said pin member, each of said actuator devices including a body carried by said box member, a threaded bore in said body extending radially relative to said box member groove, a screw threaded in said bore, an opening in said box member aligned with said bore and box member groove, and screw locking means carried by said body and releasably engaged with said screw to prevent rotation of said screw, said screw locking means including a non-circular end on said screw, a plate reciprocably supported by said body and having a non-circular opening conforming to said end of said screw, said plate having ears slidable in slots in said body to prevent rotation of said plate, and spring means for biasing said plate to a position at which said end of said screw is engaged in said non-circular opening.

11. In a connector as defined in claim 6; and means interconnecting said pad and screw for radial inward and outward movement of said pad with said screw.

References Cited

UNITED STATES PATENTS

| | | | |
|---|---|---|---|
| 2,086,431 | 7/1937 | Penick et al. | 285—141 |
| 3,345,087 | 10/1967 | Hanes et al. | 285—321X |
| 3,346,277 | 10/1967 | Ludwig | 285—308 |
| 3,350,103 | 10/1967 | Ahlstone | 285—141X |
| 3,389,735 | 6/1968 | Katz | 151—44 |
| 3,405,956 | 10/1968 | Pierce | 285—141X |

FOREIGN PATENTS

| | | | |
|---|---|---|---|
| 1,097,465 | 2/1955 | France | 285—308 |
| 2,199 | 1886 | Great Britain | 285—404 |

DAVE W. AROLA, Primary Examiner

U.S. Cl. X.R.

151—44; 285—308, 321